US011204931B1

(12) United States Patent
Du (10) Patent No.: US 11,204,931 B1
(45) Date of Patent: Dec. 21, 2021

(54) QUERY CONTINUOUS DATA BASED ON BATCH FITTING (71) Applicant: International Business Machines Corporation, Armonk, NY (US)

(72) Inventor: Ke Du, Xi'An (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/952,482

(22) Filed: Nov. 19, 2020

(51) Int. Cl.
*G06F 16/00* (2019.01)
*G06F 16/2458* (2019.01)
*G06F 16/2457* (2019.01)
*G06F 16/2453* (2019.01)
*G06F 16/21* (2019.01)
*G06F 17/18* (2006.01)
*G06F 17/16* (2006.01)

(52) U.S. Cl.
CPC ........ *G06F 16/2462* (2019.01); *G06F 16/212* (2019.01); *G06F 16/24534* (2019.01); *G06F 16/24575* (2019.01); *G06F 17/16* (2013.01); *G06F 17/18* (2013.01)

(58) Field of Classification Search
CPC ............. G06F 16/212; G06F 16/24534; G06F 16/24575; G06F 16/2462; G06F 17/16; G06F 17/18
See application file for complete search history.

(56) References Cited

U.S. PATENT DOCUMENTS

| 6,882,958 | B2 | 4/2005 | Schmidt et al. | |
|---|---|---|---|---|
| 8,742,959 | B1* | 6/2014 | Efros | H03M 7/3059 341/87 |
| 10,095,774 | B1* | 10/2018 | Soceanu | G06F 17/18 |
| 10,180,971 | B2 | 1/2019 | Bhave et al. | |
| 2007/0067283 | A1 | 3/2007 | Sengupta | |
| 2012/0237081 | A1* | 9/2012 | Datta | G06K 9/00785 382/103 |
| 2013/0325782 | A1* | 12/2013 | Fujimaki | G06N 7/005 706/46 |

(Continued)

FOREIGN PATENT DOCUMENTS

| CN | 109960775 A | * | 7/2019 |
|---|---|---|---|
| CN | 107273493 B | | 8/2020 |

OTHER PUBLICATIONS

Zhang, et al. "Personalized Assistive Web for Improving Mobile Web Browsing and Accessibility for Visually Impaired Users", ACM Transactions on Accessible Computing, vol. 10, No. 2, Article 6, Publication date: Apr. 2017.

(Continued)

*Primary Examiner* — Diedra McQuitery
(74) *Attorney, Agent, or Firm* — Patterson + Sheridan, LLP (57) ABSTRACT

Methods and systems for querying data are disclosed. In disclosed embodiments, a data set is batched to a first data set in a first range and a second data set in a second range, the batching based on a determination of data fluctuation of the data set. A first model that includes an m order polynomial based on the first data set and a second model that includes an n order polynomial based on the second data set is generated. In embodiments, a query of the data set is received, spanning at least a portion of the range of the first and second data sets. A query output is generated in response to the query, based on output from the first model and second model.

20 Claims, 5 Drawing Sheets

(56) References Cited

U.S. PATENT DOCUMENTS

2019/0079991 A1    3/2019  Gao
2020/0073631 A1*   3/2020  Vick .................. G06F 16/2365

OTHER PUBLICATIONS

Sao et al. "Fast Piecewise Polynomial Fitting of Time-Series Data for Streaming Computing," IEEE Access, vol. 8, Received Dec. 25, 2019, Accepted Feb. 4, 2020, Date of Publication Feb. 27, 2020, Date of Current verison Mar. 12, 2020, pp. 1-12. DOI: 10.1109/ACCESS.2020.2976494.

* cited by examiner

QUERY CONTINUOUS DATA BASED ON BATCH FITTING

BACKGROUND

The present invention relates to querying data, and more specifically, to querying data represented by batch-wise model fitted data.

As decision making, research, production of products, and provision of services are improved by data, the sources, types, and volumes of data in support of these activities are ever-increasing. It has been estimated that each year the volume of data produced eclipses the volume of data produced in the previous year.

To harness ever-increasing volumes of data, users query the data to create charts, reports, and other representations of data to guide decision making and development. Conventionally, generated data is stored in a database and queried via a database query language such as SQL in order to retrieve needed data, requiring substantial amounts of time (e.g., measured in days) to complete a query on a large corpus of data. Once the data is queried, it is then processed to a useful form such as a chart, also requiring significant amounts of time (e.g., measured in hours or even days) due to the sheer volume of data retrieved. As data volumes grow, time and compute resources required to query, retrieve, and use the data become increasingly large as well.

For example, querying a large (and continually growing) database of CPU usage logs in a data center may require days to accomplish due to database load times and computational power to carry out the query. Once obtained, the data is loaded to a display in the form of a chart, taking minutes, or even hours, to sufficiently load for a user to view and then act upon.

SUMMARY

According to one embodiment of the present invention, a method for querying data is disclosed, the method including batching a data set into a first data set in a first range, and a second data set in a second range, the batching based on a determination of data fluctuation of the data set. The method further includes generating a first model comprising an m order polynomial based on the first data set and a second model comprising an m order polynomial based on the second data set. The method further includes receiving a query of the data set, the query spanning at least a portion of the first range and the second range. The method further includes generating response data for the query based on the first model and second model and returning the response data.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Methods, systems, a computer-readable media for querying continuous data based on batch fitting is disclosed. In embodiments, continuous data is generated by an application and preprocessed to divide the continuous data into batches, based on the fluctuation of the data. In this context, continuous data is data being continuously received in the time domain, such as CPU usage over time, heat fluctuations in a data center over time, and the like. Fluctuation of the data is determined by calculating a number of times the data 'bounces' (e.g., a "bounce time") and changes direction relative to an axis such as the Y-axis of the data.

In one embodiment, the directionality of the data in this context is a comparison between a data point and at least the previous two data points. Where the previous two data points increase in value, such as the first previous data point is less than the second previous data point, if the next data point is less than the second previous data point (i.e., reverses the pattern of increasing values of the previous two data points), then the next data point has bounced relative to the second previous data point. Similarly, if the previous two data points decrease in value, and the next data point is greater than the second of the two previous data points, the next data point has bounced.

The fluctuation of the data is further determined by bounce strength—i.e., a summation of the sine of the data at each bounce divided by the number of times the data bounces. Bounce times and bounce strength are compared to a threshold, and the continuous data is divided into batches having bounce times and bounce strength less than or equal to the threshold. A maximum batch size is predefined by a user.

For each batch, a polynomial function of an order m, where m is the number of bounce times multiplied by the coefficient σ for the batch, is curve fitted to the data of each respective batch. Although an order m is contemplated here, where a discussion herein contemplates more than one polynomial, an additional polynomial may be called out to be of order n (or other letter), which is to be determined similarly to the description herein. The value of coefficient σ is determined by the bounce strength. The larger the value of σ is, the larger the value of σ is, and vice versa. Generally, a mapping relationship can be set, and a relationship function is initially established in the system, such as:

if Bounce Times (BT) in (0, 0.2] then σ=1
if Bounce Times (BT) in (0.2, 0.4] then σ=2
if Bounce Times (BT) in (0.4, 0.6] then σ=3
if Bounce Times (BT) in (0.6, 0.8] then σ=4
if Bounce Times (BT) in (0.8, 1.0) then σ=5

The mapping relationship between the bounce times (BT) and the coefficient σ can also be adjusted. The number of segmentation intervals of the bounce times (BT) and the coefficient σ corresponding to each partition interval can be adjusted. The larger the value of bounce strength is, the larger the value of σ is, and vice versa. In the case where BT=0 for a maximum batch size, a second order polynomial is fitted to the data (i.e., m=2).

In some embodiments, the polynomial function is fitted by regression techniques, or otherwise stated, the parameters of the polynomial function may be determined by regression. Regression in this context may be linear regression (e.g., for a linear equation) or polynomial regression (e.g., for an $N^{th}$ order polynomial).

Once the curve is fitted, the data used to fit the polynomial is discarded in certain embodiments, only the start and end indexes of each batch curve are saved, and the function is merged with the functions of other batches based on batch indices of the continuous data to form executable code. When a user queries the data over a given range, the data range of the query identifies one or more functions representing batches to be invoked to generate a response to the query based on each respective function, returning the value generated by each function at the requested points in the identified range of data. Generating requested data in this manner overcomes the deficiencies of prior approaches in which data is retrieved from a database, as programmatic generation of data is far faster than database retrieval.

With conventional approaches, continuous data is stored in a database that is then queried to retrieve desired data. As the corpus of data in the database grows increasingly large, the computational resources, and concomitantly the time required, result in increasing amounts of time needed to obtain, process, and present data. For massive bodies of data, running the query to obtain the data may take days, while processing this data to a useable format (e.g., a chart, graph, or other reports) may take additional days.

By employing the principles of disclosed embodiments, continuous data is instead stored as an aggregation of multiple curve-fitted polynomials, each representing a batch of data, indexed by the ranges of data from each batch. When a query is received, a database is not queried as with conventional approaches; instead, functions representing ranges of requested data are executed to produce the data in real-time that may be provided directly into a useable format (e.g., chart, graph, or other reports).

Figure 1:
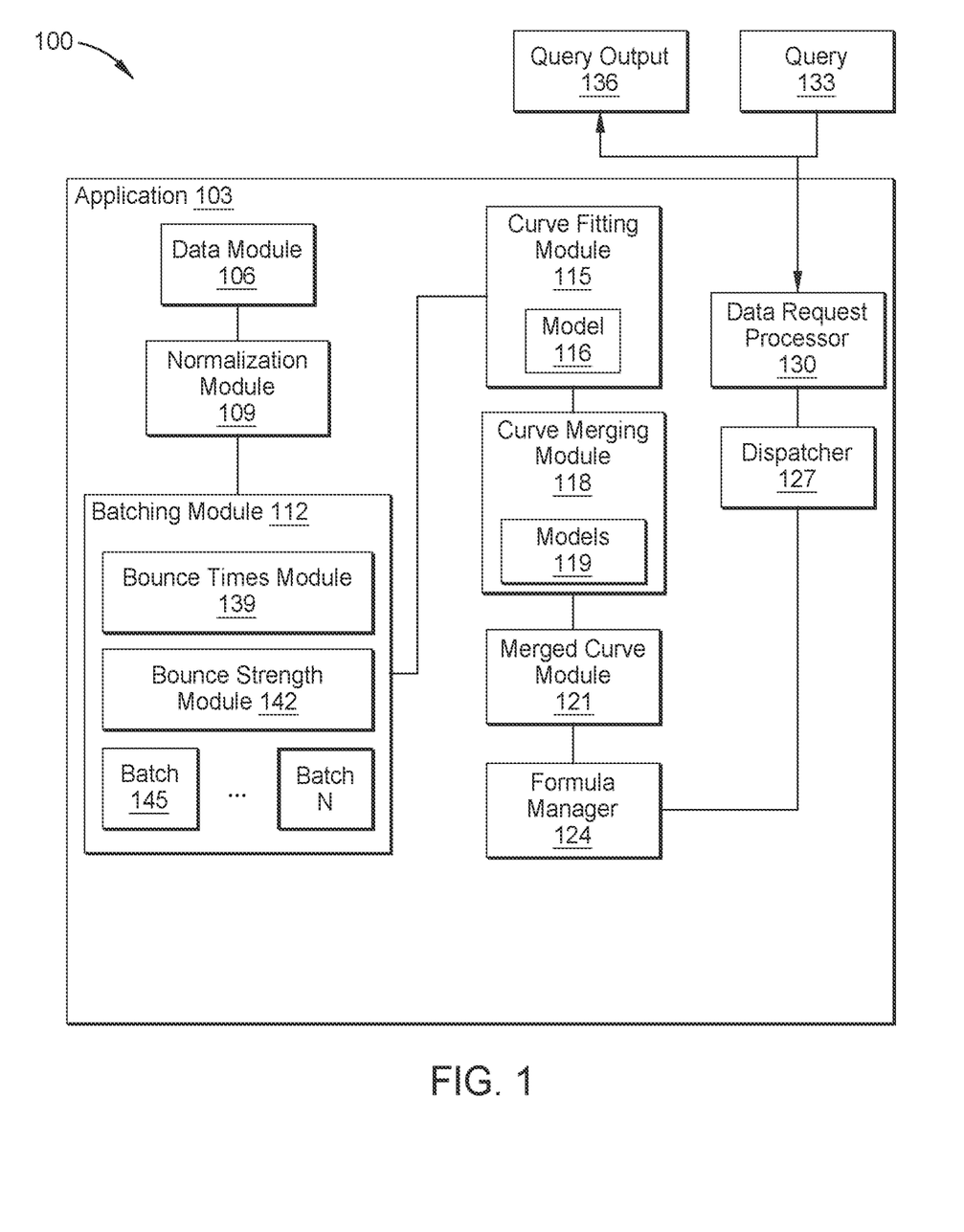
FIG. 1 depicts a system for executing a fast query method according to certain embodiments.

FIG. 1 depicts a system 100 for executing a fast query method, according to certain embodiments. System 100 includes an application 103 to generate and/or collect data at data module 106. Data in this context can be data being continually collected over time. However, methods and systems described herein need not be so limited and are similarly applicable to data that is not being continually collected.

System 100 further includes a normalization module 109, coupled to the data module 106. Normalization module 109 receives data from the data module 106 to normalize the data in a manner appropriate for curve fitting, as is understood by one of skill in the art. Normalization in this context modifies one or more aspects of the data to make gradient descent, or vector calculations, computationally less expensive. Normalization may be carried out by feature scaling, mean normalization, or other data normalization techniques available to one of ordinary skill. As is understood by one of ordinary skill, normalization is an optional operation.

System 100 further includes a batching module 112 that receives data from data module 106 that has been normalized by normalization module 109, and divides the data into batches based on data fluctuation indicated by a threshold. By setting the data fluctuation threshold, a user sets a polynomial complexity for a curve to be fitted to a batch of data that, in turn, limits the size of that batch so as to fit the indicated polynomial curve.

Data fluctuation in this context is determined by a bounce times module 139 that determines a number of times that data changes direction (i.e., a "bounce time" or BT count), and a bounce strength module 142 that determines a rate of change of data in a given range (e.g., over a given period of time, or over a given span over the x-axis of the data) of data.

For bounce times, in one embodiment, the directionality of the data is a comparison between the next data point and at least the previous two data points (but could use the previous three, four, or more data points). Where the previous two data points increased in value, such as the first previous data point is less than the second previous data point, if the next data point is less than the second previous data point (i.e., reverses the pattern of increasing values of the previous two data points), then the next data point has bounced relatively to the second previous data point; the second previous data point is the "bounce" data point, or otherwise stated, the data is said to have bounced at this point. Similarly, if the previous two data points decreased in value and the next data point is greater than the second of the two previous data points, the next data point has bounced relatively to the second previous data point; the second previous data point is the "bounce" data point or otherwise stated, the data is said to have bounced at this point. The determination of bounce times will be discussed further below in connection with FIG. 4.

In certain embodiments, bounce strength module 142 determines the bounce strength of the data (or a batch of data) by $\Sigma$ sine(θ)/bounce times count, where θ is the angle of the difference in data at each data point where a bounce occurs.

Figure 3:
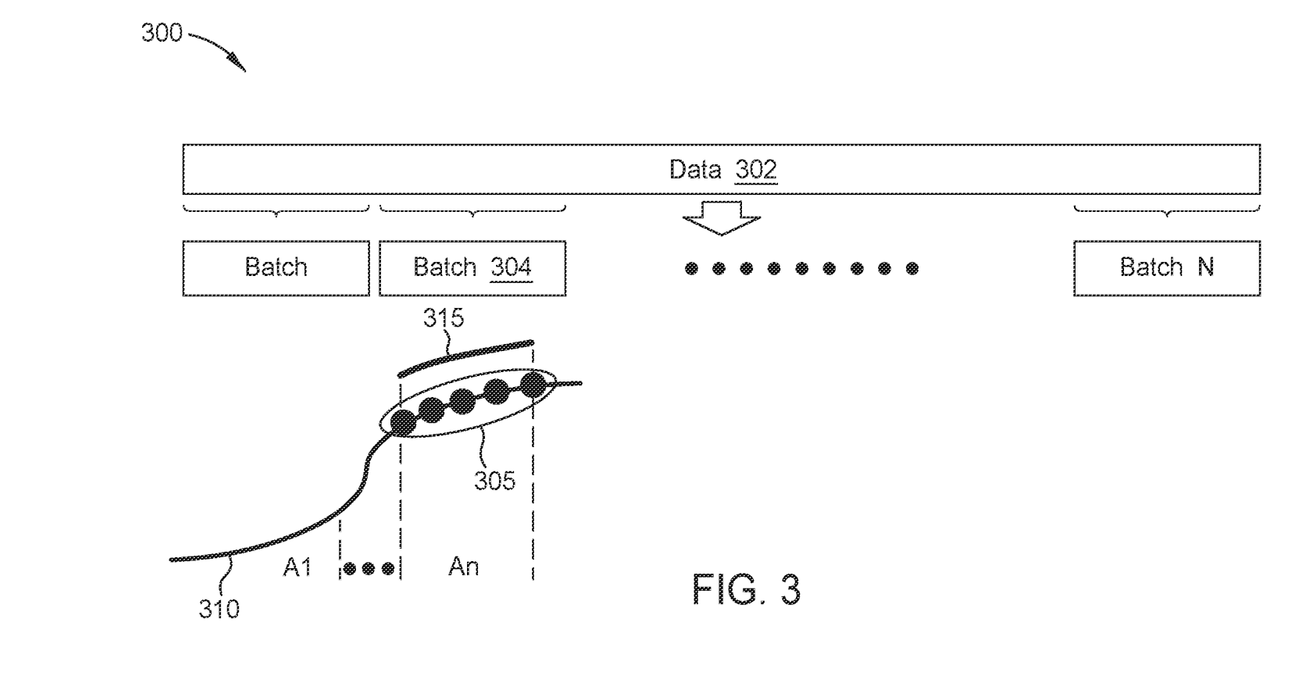
FIG. 3 depicts data batching for a fast query method, according to certain embodiments.

Based on the threshold set by the user for the fluctuation of the data, batching module 112 divides the data into batches, depicted in FIG. 3. Once divided into batches, a BT count and a bounce strength are determined for each batch, such as batch 145. A maximum batch size is predefined by a user, to set an outer limit for a batch size.

Once the data has been batched by the batching module 112, each batch is provided to a curve-fitting module 115 that develops a model 116 (also described as a fitted curve herein) for each batch, based on a polynomial function of order m, where m is a product of the BT count multiplied by the coefficient σ for the batch. Although an order m is contemplated here, where a discussion herein contemplates more than one polynomial, an additional polynomial may be called out to be of order n (or other letter), which is to be determined similarly to the description herein. The value of coefficient σ is determined by the bounce strength. The larger the value of σ is, the larger the value of σ is, and vice versa. Generally, a mapping relationship can be set, and a relationship function is initially established in the system, such as:

if Bounce Times (BT) in (0, 0.2] then σ=1
if Bounce Times (BT) in (0.2, 0.4] then σ=2
if Bounce Times (BT) in (0.4, 0.6] then σ=3
if Bounce Times (BT) in (0.6, 0.8] then σ=4
if Bounce Times (BT) in (0.8, 1.0) then σ=5

The mapping relationship between the bounce times (BT) and the coefficient σ can also be adjusted. The number of segmentation intervals of the bounce times (BT) and the coefficient σ corresponding to each partition interval can be adjusted. In the case where BT=0 for a maximum batch size, a second order polynomial is fitted to the data of this maximum size batch (i.e., m=2).

The parameters of the polynomial, in certain embodiments, are determined by regression with gradient descent (or other cost function optimization). As would be understood by one of skill in the art, the parameters may be determined by a vectorized calculation, an iterative calculation, or other methods. Although data disclosed herein is in continuous form and amenable to some form of linear (or polynomial) regression, one of skill in the art will appreciate a classification approach that may be utilized for discretely classified data. In these embodiments, techniques such as logistic regression with gradient descent may be employed by the curve fitting module 115.

Curve merging module 118 receives one or more fitted curves, or models 119, from curve fitting module 115. This module merges these models 119 into an aggregate representation of the data originally provided to data module 106 programmatically, indexed by ranges of the data. In some embodiments, aggregation of models 119 is accomplished by placing each model programmatically in an if/then statement, and indexing the conditions of the if/then by the data ranges represented by each model, such as depicted in the following code example:

```
export const curveFormula_ID=(x)=>{
  let y;
  if(x>0 && x<1000){
  return curveFormula_ID_1(x);
  }else if(x>=2000 && x<3000){
  return curveFormula_ID_2(x);
  }else if(x>=start && x<end){
  return curveFormula_ID_n(x);
  }else{ . . .
  }
}
export const curveFormula_ID_1=(x)=>{
}
export const curveFormula_ID_n=(x)=>{
  const y=W1*Math.pow(x,m)
  +W2*Math.pow(x,m-1)
  + . . .
  +Wm*x
  +Wm+1
  return y
}
```

Although an if/then statement is depicted, one of skill in the art will appreciate the variety of ways that models of individual batches of data may be indexed for invocation, such as while/do loops, for statements, recursion, data structures such as arrays, linked lists, and other techniques capable of retrieving a data model for a batch in response to a query.

By coding each curve into the application 103 as discussed above, when a query is made for a range of data, modeled data is generated by code in response to the query, removing the need to store or retrieve data from a database.

Once the models have been merged in curve merging module 118, also described herein as a final curve formula, is provided to a merged curve module 121, that may be updated from time to time by curve merging module 118 as data continues to be modeled by application 103.

The final curve formula, or aggregate model, is provided to a formula manager 124 that executes one or more individual batch modules in response to a query 133. The query is received by a data request processor 130 that parses the query to data ranges corresponding to data received by the application. A dispatcher 127 receives the data ranges from the data request processor 130, providing these ranges to the formula manager 124. Formula manager 124 executes one or more models for individual batches that may be included in the data ranges and return the result of each model to dispatcher 127. Dispatcher 127 provides the results to the data request processor 130, which in turn provides the results as query output 136. As would be understood by one of skill in the art, query output 136 may be a data feed and may include one or more charts, graphs, or other reports, containing the results of each model in the range indicated by query 133.

Figure 2:
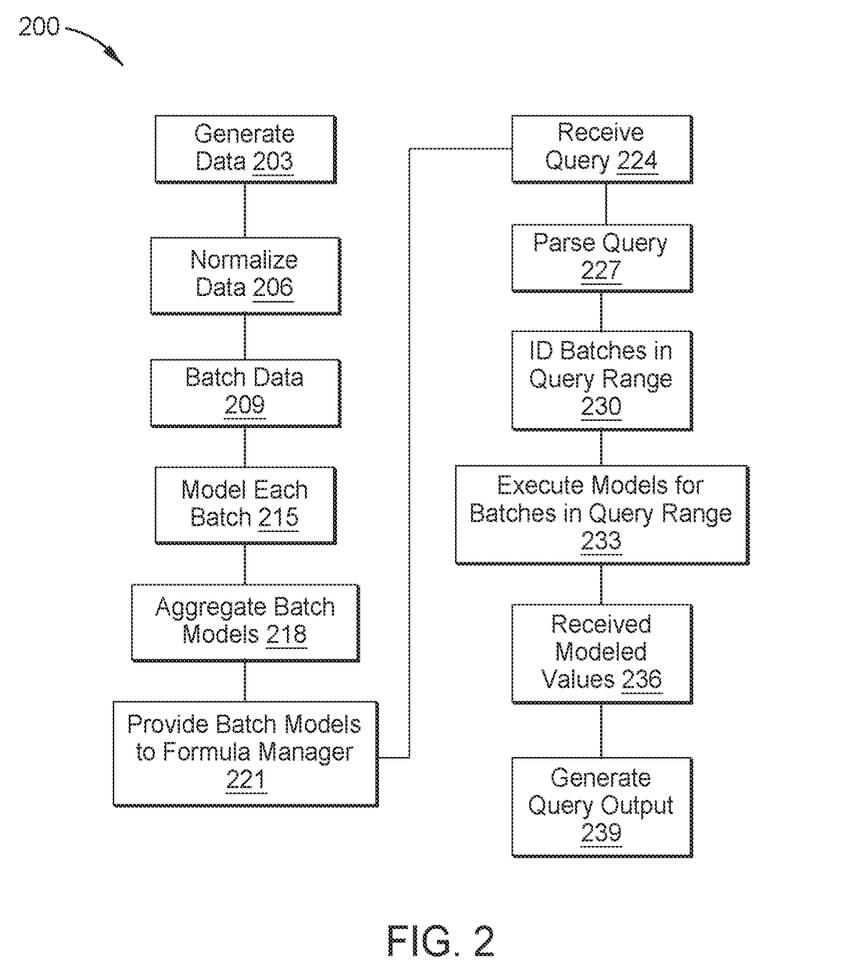
FIG. 2 depicts a flow diagram for a method of executing a fast query method according to certain embodiments.

FIG. 2 depicts a flow diagram 200 for a method of executing a fast query method, according to certain embodiments. Data is generated at 203, such as by one or more applications, sensors, a combination of applications and sensors, as continuous data. In some embodiments, the data may not be strictly continuous, stopping from time to time or stopping completely, resulting in a static corpus of data. The data generated at 203 is normalized at 206 before being divided into batches at 209.

At 209, the data is divided into batches based on bounce time count and bounce strength, as discussed above. At 212, batched data and information about each batch, namely BT count and bounce strength, are aggregated, while at 215, each batch is modeled or curve fitted. Modeling is performed by determining one or more parameters to an m order polynomial, where m is a product of the BT count and the bounce strength. Modeling, or curve fitting, may be done by regression, such as linear or polynomial regression, or other curve fitting technique known by one of skill in the art. At 218, each model for each batch is aggregated to an aggregated model representative of the data, up to the most recently modeled batch. At 221, the aggregated model such as provided by curve merging module 118 is provided to a formula manager configured to execute the model of each batch.

At 224, a query is received, the query including a range of data requested. At 227, a data request processor parses the query to obtain the range, while at 230, the range is provided to a dispatcher that identifies one or more batches associated with the range, such as by code generated by curve merging module 118 that merges the curves programmatically as discussed above. At 233, a formula manager executes the models related to each identified batch, returning data values indicated by the models back to the dispatcher. At 236, the data request processor receives the data values from the dispatcher and provides the data values as a query output 239, which may be in numerical form, a chart, a graph, or other forms capable of presenting the query output in human or machine-readable form.

FIG. 3 depicts batched and modeled data 300 for a fast query method, according to certain embodiments. Data 302 comprising data points 305, such as data from data module 106, is divided into batches, such as batch 304, based on bounce time count and bounce strength, such as by batching module 112. A merged curve 310 has been modeled, or curve fitted, to data points 302 for example, generating curves with curve fitting module 115 and merging them with curve merging module 118. Curve 315 represents a model for the data of data points 305, which is part of the larger corpus of data represented by data 302, and is a portion of the aggregated curve 310 of each batch, for example, as aggregated by merged curve module 121.

Figure 4:
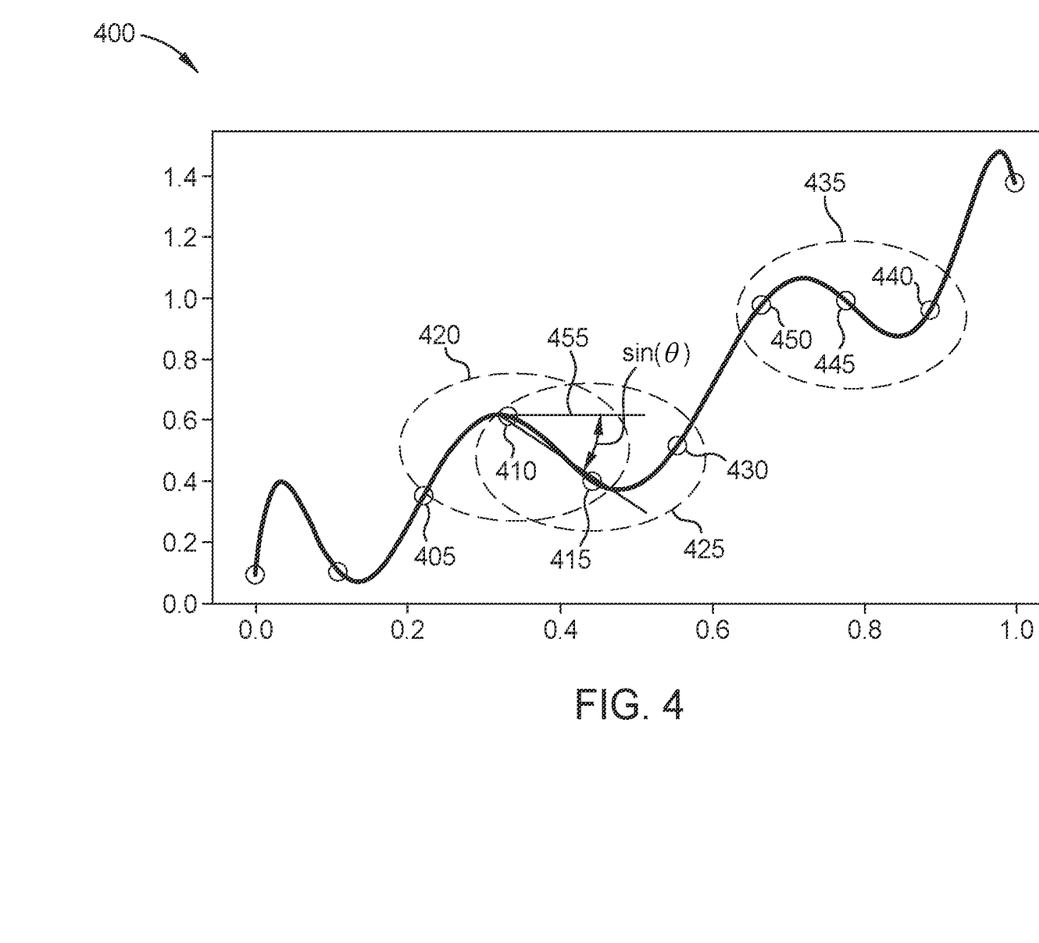
FIG. 4 depicts a graph showing data fluctuation and determination of bounce times and bounce strength, according to certain embodiments.

FIG. 4 depicts a data graph 400 showing data fluctuation and determination of bounce times and bounce strength, according to certain embodiments of data, such as continuous data, being supplied to application 100 at data module 106. As discussed above, the determination of data fluctuation is a combination of the number of times data 'bounces', bounce times (BT), or BT count, and bounce strength, indicating a rate of change of data.

A calculation of BT, for example at batching module 112 in the bounce times module 139, according to disclosed embodiments, is made from at least three data points such as data point 1 405, data point 2 410, and data point 3 415, that may continuous data such as from data module 106. Starting with data point 1 405, data point 2 410 is of increasing value relative to data point 1 405, while data point 3 415 is a decreasing value relative to data point 2 410. As such this is considered to be a first bounce 420, the points indicating the first bounce 420 encircled by a dashed line. A second bounce 425 occurs when a data point 4 430 increases in value following the decreasing value of data point 3 415 relative to data point 2 410. A third bounce point 435 occurs where a data point 5 440 is of a decreasing value relative to the trend of a data point 6 445 and data point 7 450.

A calculation of bounce strength, as discussed above in embodiments, is $\Sigma \sin(\theta)$/bounce times count. For purposes of determination of an angle $\theta$ 455, the difference between the values of the second and third data points of a set of points indicating a BT has occurred, such as data point 2 410 and data point 3 415, relative to a horizontal, may be utilized.

Figure 5:
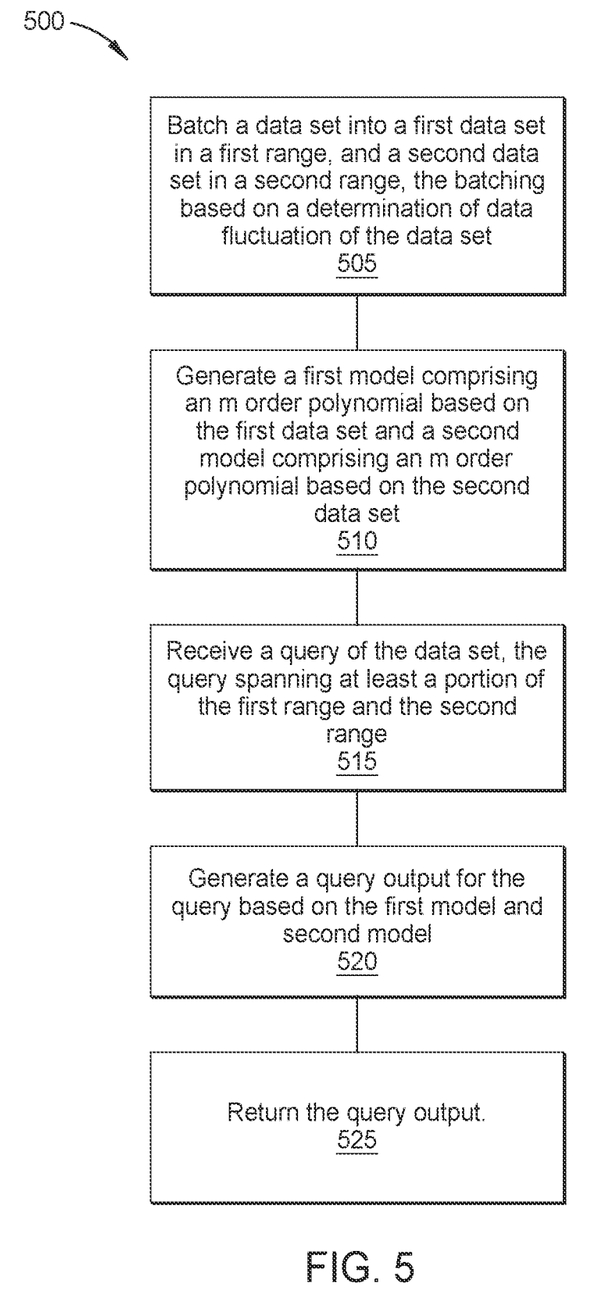
FIG. 5 depicts a method for a fast query method, according to certain embodiments.

FIG. 5 depicts a method 500 for a fast query method, according to certain embodiments. At 505, the method batches a data set into a first data set in a first range, and a second data set in a second range, the batching based on a determination of data fluctuation of the data set. In certain embodiments, the determination of data fluctuation of the data set includes dividing the data set between the first data set and the second data set based on a data fluctuation calculation. In these embodiments, the data fluctuation calculation includes generating a number of bounce times for the data set, each bounce time comprising an indication of a change of direction of data along an axis comprising the data set. The data fluctuation calculation further includes generating a bounce strength for the data set comprising a summation of a sine of an angle of two data elements of the data set having a change of direction relative to each other, divided by the number of bounce times of the data set. The determination of data fluctuation further includes comparing the data fluctuation to a threshold and dividing the data set such that a data fluctuation of the first data set and second data set are each less than or equal to the threshold.

At 510, the method generates a first model comprising an m order polynomial based on the first data set and a second model comprising an n order polynomial based on the second data set. In certain embodiments, the m order polynomial comprises a polynomial wherein m is the product of the bounce times and bounce strength of the first data set, and the n order polynomial comprises a second polynomial wherein n is the product of the bounce times and bounce strength of the second data set. In these embodiments, the first model comprises first model parameters, and the second model comprises second model parameters, each of the first and second model parameters is determined by regression. In embodiments, the regression is executed by one of a vectorized calculation comprising gradient descent, or a combination of iteratively calculating a least-squares cost function and gradient descent.

At 515, the method receives a query of the data set, the query spanning at least a portion of the first range and the second range, while at 520, a query output for the query based on the first model and second model is generated.

At 525, the method returns the query output.

In certain embodiments, the method 500 further includes receiving additional data in the data set, batching at least a portion of the additional data to a third data set in a third range, and generating a third model based on the third data set. These embodiments further include receiving a second query of the data set, the query spanning at least a portion of the first range, the second range, and the third range, generating second query output based on the first model, the second model, and the third model, and returning the second query output.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., for data generation) or related data available in the cloud. For example, embodiments of the disclosed fast query method and system could execute on a computing system in the cloud and provide fast query capability for cloud generated and/or stored data in accordance with principles disclosed herein. In such a case, the fast query methods and systems disclosed herein could provide fast query functionality as described herein and store and store regression curves representing acquired data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for querying data comprising:
    batching a data set into a first data set in a first range, and a second data set in a second range, the batching based on a determination of data fluctuation of the data set;
    generating a first model comprising an m order polynomial based on the first data set and a second model comprising an n order polynomial based on the second data set;
    receiving a query of the data set, the query spanning at least a portion of the first range and the second range;
    generating a query output for the query based on the first model and second model; and
    returning the query output.

2. The method of claim 1, wherein the determination of data fluctuation of the data set comprises:
    dividing the data set between the first data set and second data set based on a data fluctuation calculation, the data fluctuation calculation comprising:
        generating a number of bounce times for the data set, each bounce time comprising an indication of a change of direction of data along an axis comprising the data set; and
        generating a bounce strength for the data set comprising a summation of a sine of an angle of two data elements of the data set having a change of direction relative to each other, divided by the number of bounce times of the data set;
    comparing the data fluctuation to a threshold; and
    dividing the data set such that a data fluctuation of first data set and second data set are each less than or equal to the threshold.

3. The method of claim 2, wherein the m order polynomial comprises a polynomial wherein m is a product of the bounce times and bounce strength of the first data set, and the n order polynomial comprises a second polynomial wherein n is a product of the bounce times and bounce strength of the second data set.

4. The method of claim 3, wherein the first model comprises first model parameters and the second model comprises second model parameters, each of the first and second model parameters are determined by regression.

5. The method of claim 4, wherein the regression is executed by one of a vectorized calculation comprising gradient descent, or a combination of iteratively calculating a least squares cost function and gradient descent.

6. The method of claim 1 further comprising:
    receiving additional data in the data set;
    batching at least a portion of the additional data to a third data set in a third range; and
    generating a third model based on the third data set.

7. The method of claim 6 further comprising:
    receiving a second query of the data set, the query spanning at least a portion of the first range, the second range, and the third range;
    generating second query output based on the first model, the second model, and the third model; and
    returning the second query output.

8. A system for querying data, comprising:
    a processor configured to execute a method for querying data, the method comprising:
        batching a data set into a first data set in a first range, and a second data set in a second range, the batching based on a determination of data fluctuation of the data set;
        generating a first model comprising an m order polynomial based on the first data set and a second model comprising an n order polynomial based on the second data set;
        receiving a query of the data set, the query spanning at least a portion of the first range and the second range;
        generating a query output for the query based on the first model and second model; and
        returning the query output.

9. The system of claim 8, wherein the determination of data fluctuation of the data set comprises:
    dividing the data set between the first data set and second data set based on a data fluctuation calculation, the data fluctuation calculation comprising:
        generating a number of bounce times for the data set, each bounce time comprising an indication of a change of direction of data along an axis comprising the data set; and
        generating a bounce strength for the data set comprising a summation of a sine of an angle of two data elements of the data set having a change of direction relative to each other, divided by the number of bounce times of the data set;
    comparing the data fluctuation to a threshold; and
    dividing the data set such that a data fluctuation of first data set and second data set are less than or equal to the threshold.

10. The system of claim 9, wherein the m order polynomial comprises a polynomial wherein m is a product of the bounce times and bounce strength of the first data set, and the n order polynomial comprises a second polynomial wherein n is a product of the bounce times and bounce strength of the second data set.

11. The system of claim 10, wherein the first model comprises first model parameters and the second model comprises second model parameters, each of the first and second model parameters are determined by regression.

12. The system of claim 11, wherein the regression is executed by one of a vectorized calculation comprising gradient descent, or a combination of iteratively calculating a least squares cost function and gradient descent.

13. The system of claim 8 further comprising:
    receiving additional data in the data set;
    batching at least a portion of the additional data to a third data set in a third range; and
    generating a third model based on the third data set.

14. The system of claim 13 further comprising:
    receiving a second query of the data set, the query spanning at least a portion of the first range, the second range, and the third range;

generating second query output based on the first model, the second model, and the third model; and returning the second query output.

15. A computer program product for querying data, the computer program product comprising:

a computer-readable storage medium having computer-readable program code embodied therewith, the computer-readable program code being executable by one or more computer processors to:

batch a data set into a first data set in a first range, and a second data set in a second range, the batching based on a determination of data fluctuation of the data set;

generate a first model comprising an m order polynomial based on the first data set and a second model comprising an n order polynomial based on the second data set;

receive a query of the data set, the query spanning at least a portion of the first range and the second range;

generate a query output for the query based on the first model and second model; and return the query output.

16. The computer program product of claim 15, wherein the determination of data fluctuation of the data set comprises:

dividing the data set between the first data set and second data set based on a data fluctuation calculation, the data fluctuation calculation comprising:

generating a number of bounce times for the data set, each bounce time comprising an indication of a change of direction of data along an axis comprising the data set; and generating a bounce strength for the data set comprising a summation of a sine of an angle of two data elements of the data set having a change of direction relative to each other, divided by the number of bounce times of the data set;

comparing the data fluctuation calculation to a threshold; and dividing the data set such that a data fluctuation calculation of first data set and second data set are less than or equal to the threshold.

17. The computer program product of claim 16, wherein the m order polynomial comprises a polynomial wherein m is a product of the bounce times and bounce strength of the first data set, and the n order polynomial comprises a second polynomial wherein n is a product of the bounce times and bounce strength of the second data set.

18. The computer program product of claim 17, wherein the first model comprises first model parameters and the second model comprises second model parameters, each of the first and second model parameters are determined by regression.

19. The computer program product of claim 18, wherein the regression is executed by one of a vectorized calculation comprising gradient descent, or a combination of iteratively calculating a least squares cost function and gradient descent.

20. The computer program product of claim 15 further comprising receiving additional data in the data set;

batching at least a portion of the additional data to a third data set in a third range; and generating a third model based on the third data set.

* * * * *